July 12, 1932.   G. HOLST ET AL   1,866,565
DEVICE FOR CONVERTING ELECTRIC OSCILLATIONS INTO MECHANICAL VIBRATIONS
Filed April 7, 1927
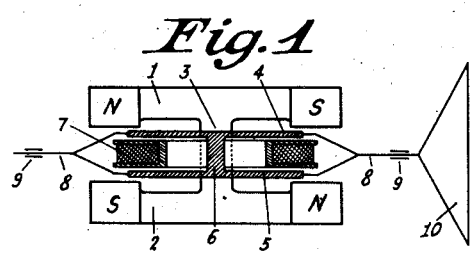
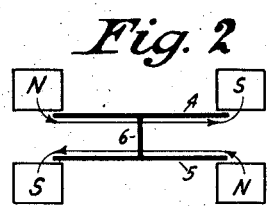
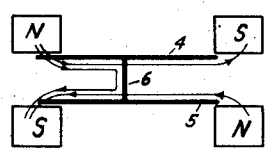
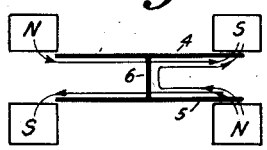
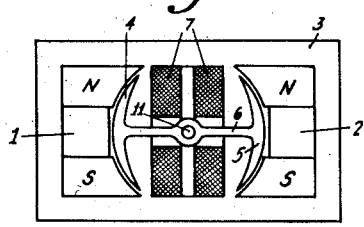
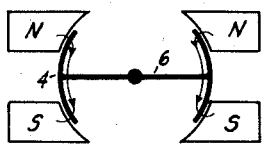
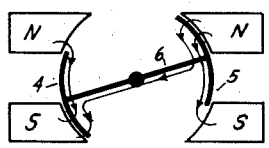
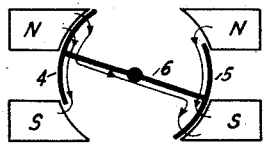
INVENTORS
Gilles Holst and Ekko Oosterhuis
BY
ATTORNEY Patented July 12, 1932

1,866,565

UNITED STATES PATENT OFFICE

GILLES HOLST AND EKKO OOSTERHUIS, OF EINDHOVEN, NETHERLANDS, ASSIGNORS TO RADIO CORPORATION OF AMERICA, A CORPORATION OF DELAWARE

DEVICE FOR CONVERTING ELECTRIC OSCILLATIONS INTO MECHANICAL VIBRATIONS

Application filed April 7, 1927, Serial No. 181,650, and in the Netherlands April 10, 1926.

This invention has reference to a device for converting electric oscillations into mechanical vibrations such, for example, as sound-vibrations.

In known devices of this kind the electric oscillations are caused to influence the intensity of a magnetic field in which an armature (for example a resilient membrane) is adapted to move. After being moved by the magnet out of its position of equilibrium, the said armature must be continuously moved back to said position under the influence of a mechanical force. As a rule this force, which is frequently referred to as the "controlling force" must be comparatively great, since the attractive action of the magnet on the armature increases greatly as the armature approaches the magnet and in this position the armature consequently becomes unstable unless comparatively strong springs are caused to act upon it. However, strong springs present the disadvantage that the deep tones are reproduced with more difficulty than higher tones and this objection is inherent to most loudspeakers of this type.

The object of this invention is to provide an armature which responds to comparatively small forces exerted thereon to produce fairly large amplitudes of vibration. A further object of the invention is to reduce the strength of the "controlling force" so that the suppression of the lower frequency vibrations as a result of the requisite great controlling force is avoided.

The invention consists in causing the electric oscillations to act upon an armature which is adapted to move in a magnetic field from its position of equilibrium and to which position the armature continuously tends to return under the influence of the magnetic field itself.

According to the invention the armature may be located between the unlike poles of two magnets which are oppositely disposed in pairs.

In one modification of the invention the armature is arranged to move longitudinally of its axis and it can be caused to be magnetized by the oscillations in a direction perpendicular to the said longitudinal axis and parallel to the plane passing through the poles of the magnets.

Another variation of the invention is to mount the armature on a shaft perpendicular to its longitudinal axis and so that the armature is arranged with its ends adjacent the poles of one or two magnets, the poles of like nature of which are oppositely disposed.

Further features of the invention will be clear from the description hereinafter in which the invention will be more clearly understood by reference to the accompanying drawing.

In the said drawing:

Figure 1 shows diagrammatically a plan of a device according to the invention in which the armature is guided rectilinearly.

Figures 2, 3 and 4 show diagrammatically the progress of the lines of force in three different positions of the armature.

Figure 5 shows diagrammatically a plan of a different construction in which the armature is adapted to rotate.

Figures 6, 7 and 8 show diagrammatically the progress of the lines of force in three different positions of the armature in the construction of Figure 5.

Referring to Fig. 1, 1 and 2 represent two magnets which may be electromagnets or permanent magnets and which have their poles of unlike nature oppositely disposed. The center portions of the said magnets are united by a magnetic yoke 3. An H-shaped armature is adapted to move between the pole-shoes of the magnets, said armature having its legs 4 and 5 located in front of the pole-shoes of the magnets 1 and 2 respectively. The center portions of the legs are united by a magnetic yoke 6 which is surrounded by a coil 7. Enough space is provided between the coil and the armature to permit the armature to perform vibrations of considerable amplitude (say some millimetres) from its position of equilibrium.

The armature is guided rectilinearly by means of two bifurcated rods 8 engaging its ends and passing through guides 9. On the end of one of the said rods a cone 10 is carried by means of which the vibrations of the armature are converted into sound-vibrations.

Referring to Figure 2 the armature is diagrammatically shown in its central position relatively to the magnets 1 and 2. The coil 7 is substantially currentless when the armature assumes this position. The lines of force emerge from the two north poles follow the two legs 4 and 5 in opposite directions and enter again into the two south-poles. As a result the armature is in stable equilibrium. The value of the force which opposes displacements of the armature from this position of equilibrium depends upon the intensity of the two magnets 1 and 2 and on the width of the air gaps between the poles and the armature.

When a current flows in a determined direction in the coil 7, the yoke 6 of the armature is magnetized so that the legs 4 and 5 obtain opposite polarities. Fig. 3 shows the case in which the leg 4 becomes a south-pole and the leg 5 becomes a north-pole. The progress of the lines of force is as shown and the armature moves toward the left as indicated in the figure. The lines of force which follow the two legs 4 and 5 tend to return the armature to its position of equilibrium. If the current continues flowing in the coil 7 in the same direction but at a different value and if the flux caused thereby does not exceed a determined maximum value, the armature will adjust itself into a new position of equilibrium which is located at some distance to the left of the central position between the magnet poles.

Reversal of the direction of the current in the coil 7 causes a movement of the armature to the opposite side of the center position as shown in Figure 4, the same remarks applying, as those made with reference to Figure 3.

When the coil 7 is traversed by electric oscillations, the armature will vibrate in accordance with the variations of the said oscillations unless its inertia is to great. The most advantageous state of affairs is obtained, if the magnetic controlling force which returns the armature to its central position of equilibrium, is no stronger than the force necessary to move the armature back from the predetermined extreme positions. This result can be secured by varying the magnetic resistances of the iron legs 4 and 5 and the resistance in the yoke 6 relatively to each other. This may be accomplished, for example, by increasing or decreasing the section of the said legs or that of the yoke. If the yoke is made heavier the unstable condition is approached, if on the contrary it is made lighter, the more stable condition results.

Figure 5 shows a construction in which the armature consists of a double T-shaped magnetic body, for example of iron, which comprises two segments 4 and 5 which are united by a yoke 6 secured to a pivoted shaft 11. The pole-shoes of two magnets 1 and 2 which have their poles of like nature oppositely disposed on a magnetically conducting yoke 3 are turned out concentrically to the shaft 11 so as to leave only a very narrow air gap (0.1 millimetre or less) between the said poles and the segments 4 and 5. The yoke is magnetized by two stationary coils 7 which are spaced far enough apart so as to permit the shaft 11 to pass between the coils and to leave enough space so that the yoke 6 may oscillate on its pivot from its central position of equilibrium, thru a predetermined amplitude.

Figs. 6, 7 and 8 show diagrammatically the progress of the lines of force when the coils 7 are not energized and when energized by currents in opposite directions. The pivoted armature functions entirely analogous to that described in connection with Figures 1 to 4 and for this reason a detailed description will not be given.

Also in the construction as shown in Fig. 5 the degree of stability can be controlled by regulating the iron section of the yoke 6 relatively to that of the two segments 4 and 5. If the section of the yoke is made smaller, the stability increases and conversely.

A further advantage inherent to the structure described depends upon the air gap between the armature and the pole pieces always remaining constant. This arrangement presents the advantage that the said air gap can be extremely small so that a comparatively low magneto-motive force suffices to bring about intense attractive or repulsive forces between the magnets and the movable armature. Further the extent of the movement of the armature is not limited mechanically by the width of the air gaps.

Having thus described our invention what we claim is:

1. A device for converting electric oscillations into mechanical vibrations comprising a pair of magnets, a ferromagnetic armature whose ends are disposed between poles of unlike nature, said armature normally assuming a position of equilibrium between said magnets, a fixed coil surrounding said armature, said coil carrying electrical oscillations which are converted into mechanical vibrations of the armature, said armature in its movement maintaining a constant gap between the magnet poles and the armature.

2. A device for converting electric oscillations into mechanical vibrations comprising a pair of magnets, an H shaped armature having its ends disposed between said magnets, said armature normally assuming a position of equilibrium between said magnets, a fixed coil surrounding the center bar and positioned between the side bars of said H shaped armature, the armature being free to move within the coil, said coil carrying the electric oscillations which are converted into mechanical vibrations of the armature, said armature in its movements being adapted to maintain a constant gap between the armature and the magnet pole pieces.

3. A device for converting electric oscillations into mechanical vibrations comprising a pair of magnets whose poles are rectangular in form and disposed with the north pole of one magnet opposite the south pole of the other magnet, an H shaped armature having its ends disposed between adjacent faces of said magnet poles parallel to the direction of movement of the armature and adapted to assume a position of equilibrium between said magnets, said armature maintaining a fixed gap between the pole faces and the armature throughout its movement, a fixed coil surrounding the center bar and disposed between the side bars of the H shaped armature, the armature being free to move within the coil, said coil carrying the electrical oscillations which are converted into mechanical vibrations of the armature.

4. In a driving motor for a sound reproducer the combination of an armature comprising two parallel members and a connecting member substantially perpendicular thereto, a winding surrounding said connecting member, and a pair of magnetic poles disposed adjacent each of said parallel members, the poles of each pair being located on the same side of said parallel members.

5. In a driving motor for a sound reproducer the combination of an armature comprising two parallel members and a connecting member substantially perpendicular thereto, a winding surrounding said connecting member, and a pair of magnetic poles disposed adjacent each of said parallel members, said poles being located on the opposite sides of said parallel members from said connecting member.

6. A magnet system for an acoustic device comprising means providing two pairs of magnet poles, a ferromagnetic armature positioned with its ends adjacent said poles, an alternating current coil surrounding said armature, and means for supporting said armature for movement in a line substantially perpendicular to the axis of said coil.

7. A device for converting electric oscillations into mechanical vibrations comprising a pair of magnets, a ferromagnetic armature whose ends are disposed between poles of unlike nature, said armature normally assuming a position of equilibrium between said magnets and cooperating with said magnets by means of paths of magnetic flux through said armature for causing movement thereof, a coil fixed with respect to said magnets surrounding said armature, said coil carrying electrical oscillations which are converted into mechanical vibrations of the armature, said armature in its movement maintaining a constant gap between the magnetic poles and the armature.

8. A driving motor for a sound reproducer comprising a pair of magnets whose poles are oppositely disposed, a ferromagnetic armature positioned between oppositely disposed poles of said magnet, said armature cooperating with said poles by reason of its ferro-magnetic nature to cause movement of the armature, means for supporting said armature to move in a straight line in a direction at right angles to its magnetic axis, and stationary means for energizing said armature.

9. A driving motor for a sound reproducer comprising a pair of magnets positioned so that their poles are oppositely disposed, a ferro-magnetic armature positioned between the oppositely disposed poles of said magnets, said armature providing a path of low reluctance for the magnetic fields set up by said magnets, whereby motion of said armature is obtained, means for energizing said armature for causing movement thereof, said means being fixed with respect to said magnets, and suspending means for said armature for maintaining a constant air gap between said armature and the pole faces of said magnets throughout the movement of said armature.

10. A device for the interconversion of electrical oscillations and magnetic vibrations comprising means forming two pairs of magnetic poles, an armature having one end positioned adjacent one pair of said poles and its other end positioned adjacent the other pair of magnetic poles, means for maintaining a constant distance between said armature and the faces of said poles throughout the movement of said armature and a winding fixed with respect to said poles and surrounding said armature.

11. A device for the interconversion of electrical oscillations and mechanical vibrations comprising means forming two pairs of magnetic poles, a ferromagnetic armature for magnetically cooperating with said poles, said armature having one end positioned adjacent one pair of said poles and its other end positioned adjacent the other pair of said poles, means for suspending said armature for movement in a straight line for mantaining a constant gap between the ends of said armature and the faces of said poles, and a stationary winding surrounding said armature.

GILLES HOLST.
EKKO OOSTERHUIS.